(12) United States Patent
Clemm et al.

(10) Patent No.: US 8,677,319 B2
(45) Date of Patent: Mar. 18, 2014

(54) COMPUTER METHOD AND SYSTEM FOR COMPOSITE STATE MANAGEMENT OF SOFTWARE CHANGE REQUESTS

(75) Inventors: Geoffrey M. Clemm, Concord, MA (US); Robert W. Myers, Gloucester, MA (US); Stuart W. Poulin, Sammamish, WA (US); William Morgan Stair, Westford, MA (US)

(73) Assignee: International Business Machines Corporation, Armonk, NY (US)

( * ) Notice: Subject to any disclaimer, the term of this patent is extended or adjusted under 35 U.S.C. 154(b) by 1896 days.

(21) Appl. No.: 11/459,743

(22) Filed: Jul. 25, 2006

(65) Prior Publication Data

US 2008/0046876 A1    Feb. 21, 2008

(51) Int. Cl.
*G06F 9/44* (2006.01)

(52) U.S. Cl.
USPC ........... 717/122; 717/100; 717/101; 717/102; 717/103; 717/104; 717/120; 717/121

(58) Field of Classification Search
None
See application file for complete search history.

(56) References Cited

U.S. PATENT DOCUMENTS

| | | | |
|---|---|---|---|
| 4,809,170 A | 2/1989 | Leblang et al. | |
| 5,511,191 A | 4/1996 | de Leeuw van Weenen et al. | |
| 5,907,704 A * | 5/1999 | Gudmundson et al. | 717/100 |
| 6,101,481 A | 8/2000 | Miller | |
| 6,243,747 B1 * | 6/2001 | Lewis et al. | 709/220 |
| 6,601,233 B1 * | 7/2003 | Underwood | 717/102 |
| 6,714,913 B2 | 3/2004 | Brandt et al. | |
| 7,155,700 B1 * | 12/2006 | Sadhu et al. | 717/103 |
| 7,287,249 B2 * | 10/2007 | Coyle et al. | 717/168 |
| 7,330,822 B1 | 2/2008 | Robson et al. | |
| 7,516,438 B1 | 4/2009 | Leonard et al. | |
| 7,631,006 B2 | 12/2009 | Hagstrom et al. | |
| 7,640,548 B1 | 12/2009 | Yu et al. | |

(Continued)

OTHER PUBLICATIONS

Worth et al. Comparison of CVS and Subversion. [online] (Oct. 2005). Software Engineering Group, pp. 1-12. Retrieved From the Internet <http://www.softeng.rl.ac.uk/st/archive/SoftEng/SESP/Publications/cvs-svn/cvs-svn.pdf>.*

*Primary Examiner* — Emerson Puente
*Assistant Examiner* — Jonathan R Labud
(74) *Attorney, Agent, or Firm* — Hamilton, Brook, Smith & Reynolds, P.C.

(57) ABSTRACT

Computer method and apparatus manage requests to make changes to a given software system (e.g., application program or program portion). The invention method and apparatus form a change request object representing a user's request to make a change to the given software system. The invention method and apparatus form one or more hierarchies of objects and sub-objects to represent work to be performed and work performed in making the requested change. One embodiment creates a root issue object for each change request object and allows a user to partition an issue object into issue sub-objects. The embodiment (a) allows a user to create a task object to define the work needed to address an issue and allows a user to partition a task object into task sub-objects, and (b) allows a user to create an activity object to track work performed and allows a user to partition an activity object into activity sub-objects. Issue objects and issue sub-objects are relatable to task objects and task sub-objects. Task objects and task sub-objects are relatable to activity objects and activity sub-objects. State of an object is determined based on the status of each of its related objects and sub-objects.

23 Claims, 6 Drawing Sheets

(56) References Cited

U.S. PATENT DOCUMENTS

| | | |
|---|---|---|
| 7,840,944 B2 | 11/2010 | Brunswig et al. |
| 2002/0026514 A1* | 2/2002 | Ellis et al. .................... 709/227 |
| 2002/0049621 A1* | 4/2002 | Bruce .............................. 705/7 |
| 2002/0049962 A1 | 4/2002 | Kelbaugh et al. |
| 2003/0107591 A1 | 6/2003 | Jameson |
| 2004/0030992 A1 | 2/2004 | Moisa et al. |
| 2004/0117759 A1 | 6/2004 | Rippert, Jr. et al. |
| 2005/0071355 A1 | 3/2005 | Cameron et al. |
| 2005/0125464 A1* | 6/2005 | Kline .......................... 707/204 |
| 2005/0137928 A1 | 6/2005 | Scholl et al. |
| 2005/0138031 A1 | 6/2005 | Wefers |
| 2005/0138640 A1* | 6/2005 | Fresko .......................... 719/318 |
| 2005/0177532 A1* | 8/2005 | Desbiens ........................ 707/1 |
| 2005/0187739 A1* | 8/2005 | Baust et al. ................... 702/184 |
| 2005/0192822 A1* | 9/2005 | Hartenstein et al. ............. 705/1 |
| 2006/0031812 A1 | 2/2006 | Olson et al. |
| 2006/0045461 A1* | 3/2006 | Oikawa ......................... 386/46 |
| 2006/0053043 A1* | 3/2006 | Clarke ............................ 705/8 |
| 2006/0173879 A1 | 8/2006 | MacFarlane et al. |
| 2006/0225032 A1* | 10/2006 | Klerk et al. ................... 717/105 |
| 2006/0235736 A1 | 10/2006 | Guckenheimer |
| 2007/0067772 A1 | 3/2007 | Bustamante |
| 2007/0129976 A1* | 6/2007 | Hochberg et al. ................. 705/7 |
| 2007/0192156 A1 | 8/2007 | Gauger |
| 2007/0203952 A1* | 8/2007 | Baron et al. .................. 707/200 |

\* cited by examiner

COMPUTER METHOD AND SYSTEM FOR COMPOSITE STATE MANAGEMENT OF SOFTWARE CHANGE REQUESTS

BACKGROUND OF THE INVENTION

Illustrated in FIG. 1 is a typical software change management repository 100 of the prior art. In a software change management repository 100, a set of objects 99 is maintained to capture the set of changes that have been requested by the developers and users of a software system. These change request objects 99 are known by a variety of names in different change management repositories, such as Modification-Requests, Enhancement-Requests, Work-Items, Defects, and Bugs. In this disclosure, the term "Change-Request" is used to refer to these types of objects 99.

The information about a change request is captures in a set of properties of the Change-Request object 99. The property is represented by either an atomic value (such as a string, an integer, or a date) or a reference to another object 99 as illustrated by the 'XX' and dotted line arrow, respectively, of object 99a in FIG. 1. Some properties are pre-defined and present on all Change-Request objects 99, but most properties are determined by a customer, and can vary from project to project. The current state of a change request is summarized in a pre-defined State property 102 of the Change-Request object 99. Although the State property 102 is pre-defined, the legal values of the State property are determined by a customer. The customer defines a set of allowed transitions from one State value to another, and defines the actions that perform those transitions.

Some key problems with maintaining the state of a Change-Request object 99 are as follows:

1. Different stake-holders in the change management process have different perspectives on what the current state of a given Change-Request should be. For example, a developer might believe that the Issue is resolved, while the submitter of the Issue believes the Issue requires further work. One approach to this problem is to introduce composite states such as "open-development-pending", "open-development-complete" and, "closed-development-complete". This approach results in a combinatorial explosion in the number of states as the number of stake-holders in the Change-Request management process increases, which makes it difficult to introduce new stake-holders to the change management process.
2. Multiple users of a software system might report similar problems. If each of these problems is entered as a separate Change-Request object 99, it is error-prone and expensive to update the properties of each of these Change-Request objects as the problem is being resolved. If only a single Change-Request object 99 is used to track all of these problems, such as what release of the system was demonstrating the problem, and whether the problem has been resolved on the particular platform or product variant needed by a given user.
3. A given Change-Request might need to be resolved in different ways in multiple releases of variants of a given software system. It is important to be able to independently track how work is progressing in each of these releases or variants, but if there are separate Change-Request objects 99 for each release or variant, it is error-prone and expensive to update the problem description information on each of those change requests.
4. A given set of changes might be able to contribute to the completion of multiple tasks (especially when they are tasks to fix the same problem in different releases or variants of the software system). It is error-prone and expensive to be updating the multiple Change-Request objects 99 as work on that single activity progresses.
5. Different stake-holders in the change management process might be working at different sites with different replicas of the change management repository 100, or working disconnected with a personal replica of a subset of the change management repository 100. When multiple replicas are in use, different stake-holders can unwittingly modify the Change-Request object 99 in incompatible ways, resulting in difficult merge scenarios that require expensive manual merging or result in Joss of information from automated merging. A standard solution to this problem is to assign one replica of the repository 100 as the master of a given Change-Request, and only users accessing that replica of the repository 100 can make any modifications to that Change-Request object 99. But this results in serious delays and loss of information as stake-holders wait for mastership to be transferred to their replica.

SUMMARY OF THE INVENTION

In the present invention, a Change-Request object is partitioned into a set of linked sub-object hierarchies: one Issue hierarchy, zero or more Task hierarchies, and zero or more Activity hierarchies. A given Task can be associated with multiple Issues (and therefore contribute to multiple Change-Requests), and a given Activity can be associated with multiple Tasks (and therefore contribute to multiple Change-Requests). Each Task, Issue and Activity is represented by a respective object which serves as a sub-object to the Change Request object. Each sub-object is owned by a single stake-holder (individual user) and has its own Status field that identifies the state of the Change-Request from the perspective of that individual. Each stake-holder then interacts with a single sub-object with a relatively simple set of Status values and Status transitions, while the State of the Change-Request is a composite value computed from the Status of each of the objects in the sub-object hierarchies of the Change-Request.

In a preferred embodiment, a computer method and apparatus for making changes to a given software system, comprise the steps of:

forming a change request object to represent a user's request to make a change to a given software system;

creating a root issue object for that change request object, the root issue object enabling a hierarchy of issue objects, each issue object representing a respective issue;

allowing a user or means to partition an issue object into issue sub-objects;

allowing a user or means to create a task object to define work needed to address an issue;

allowing a user or means to partition a task object into task sub-objects;

allowing a user or means to create an activity object to track work performed;

allowing a user or means to partition an activity object into activity sub-objects;

allowing a user or means to relate issue objects and issue sub-objects to task objects and task sub-objects;

allowing a user or means to relate task objects and task sub-objects to activity objects aid activity sub-objects;

determining the state of an object based on the status of each of its related objects and sub-objects.

The change request objects are stored in a repository and managed therein by a manager which computes the state of an object as a function of status of its related objects and sub-objects.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of preferred embodiments of the invention follows.

Figure 1:
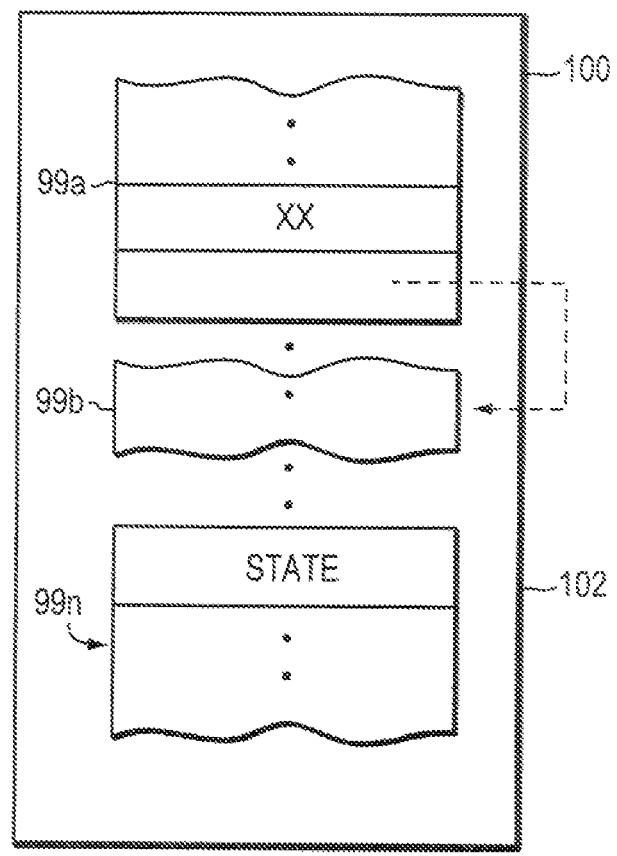
FIG. 1 is a block diagram of a change management repository of prior art.
Figure 2A:
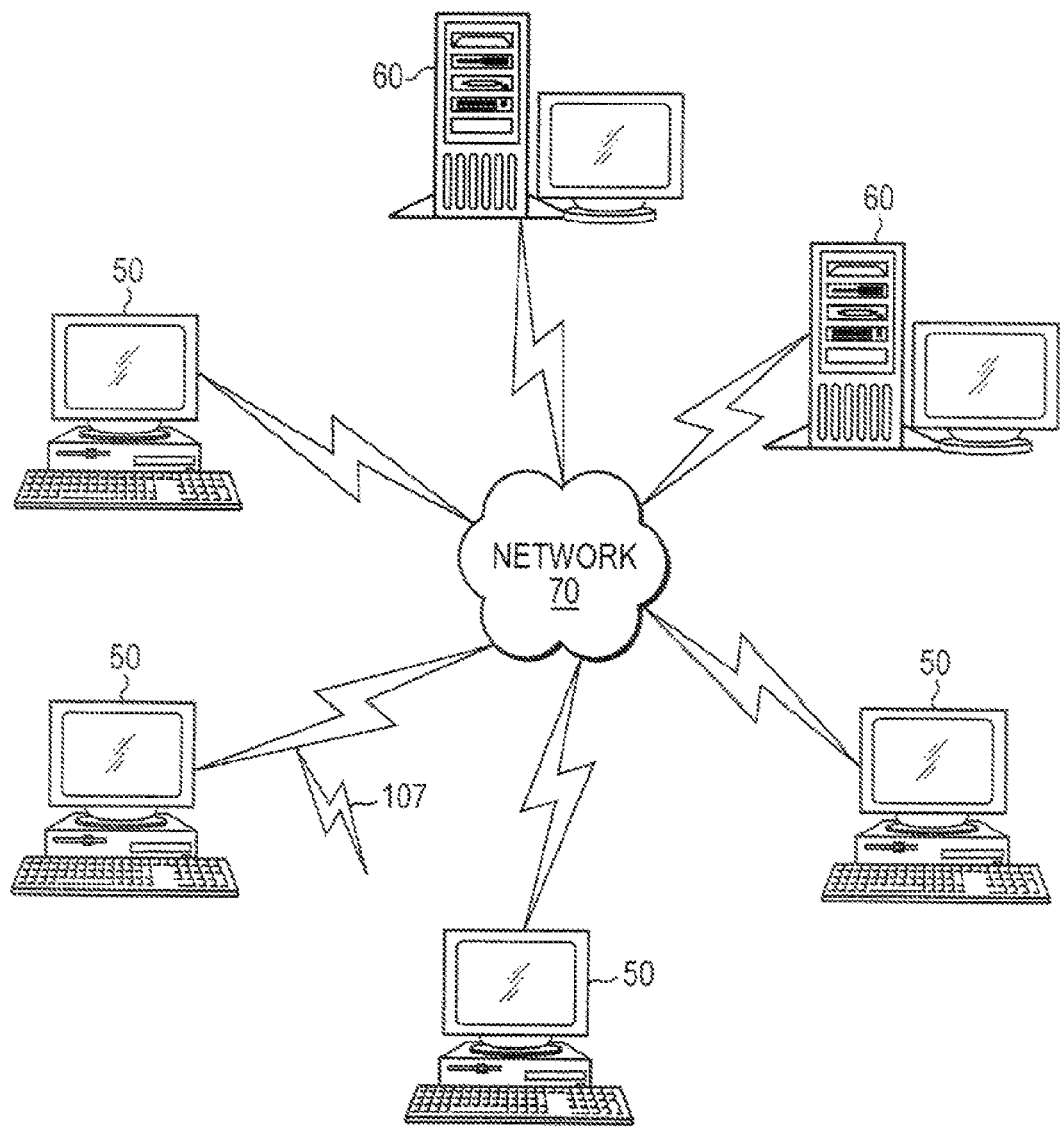
FIGS. 2a and 2b are schematic and block diagrams, respectively, of computer network and digital processing environment in which embodiments of the present invention are deployed.

FIG. 2a illustrates a computer network or similar digital processing environment in which the present invention may be implemented.

Client computer(s) 50 and server computers) 60 provide processing, storage, and input/output devices executing application programs and the like. Client computer(s) 50 can also be linked through communications network 70 to other computing devices, including other client devices/processes 50 and server computer(s) 60. Communications network 70 can be part of a remote access network, a global network (e.g., the Internet), a worldwide collection of computers, Local area or Wide area networks, and gateways that currently use respective protocols (TCP/IP, Bluetooth, etc) to communicate with one another. Other electronic device/computer network architectures are suitable.

Figure 2B:
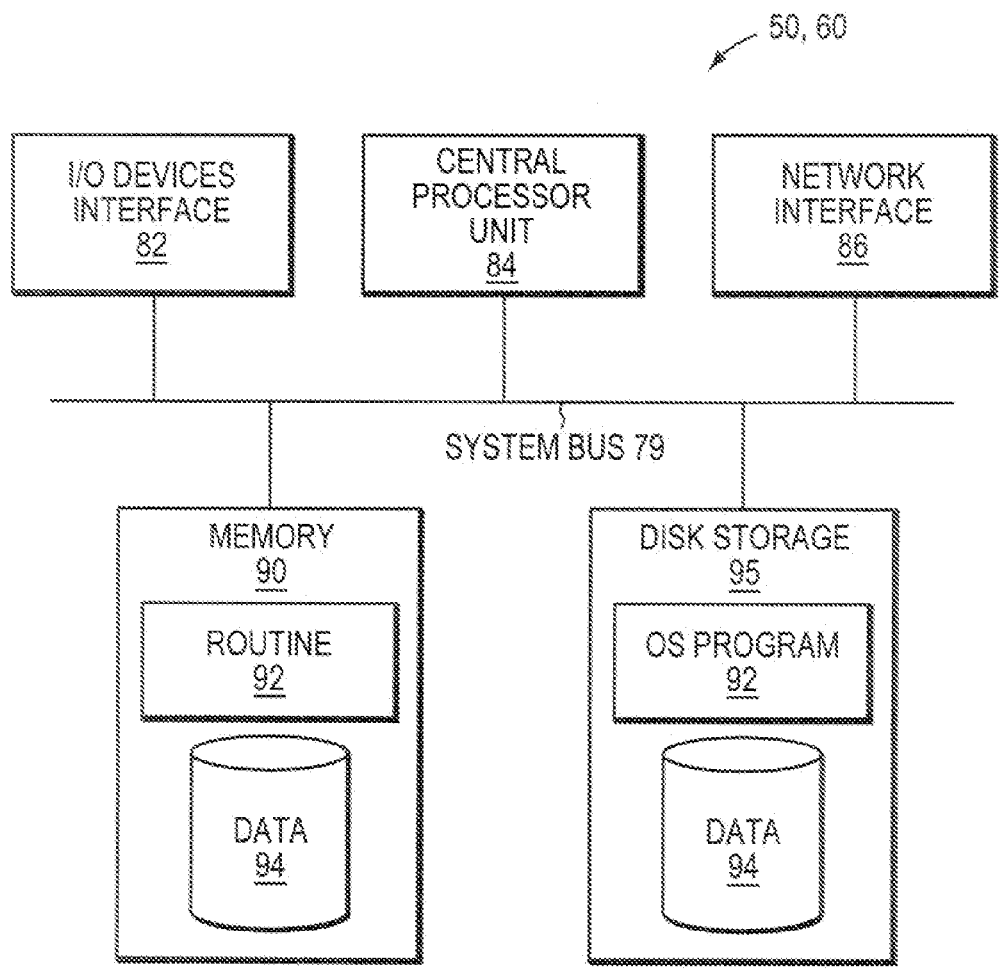
Figure 4:
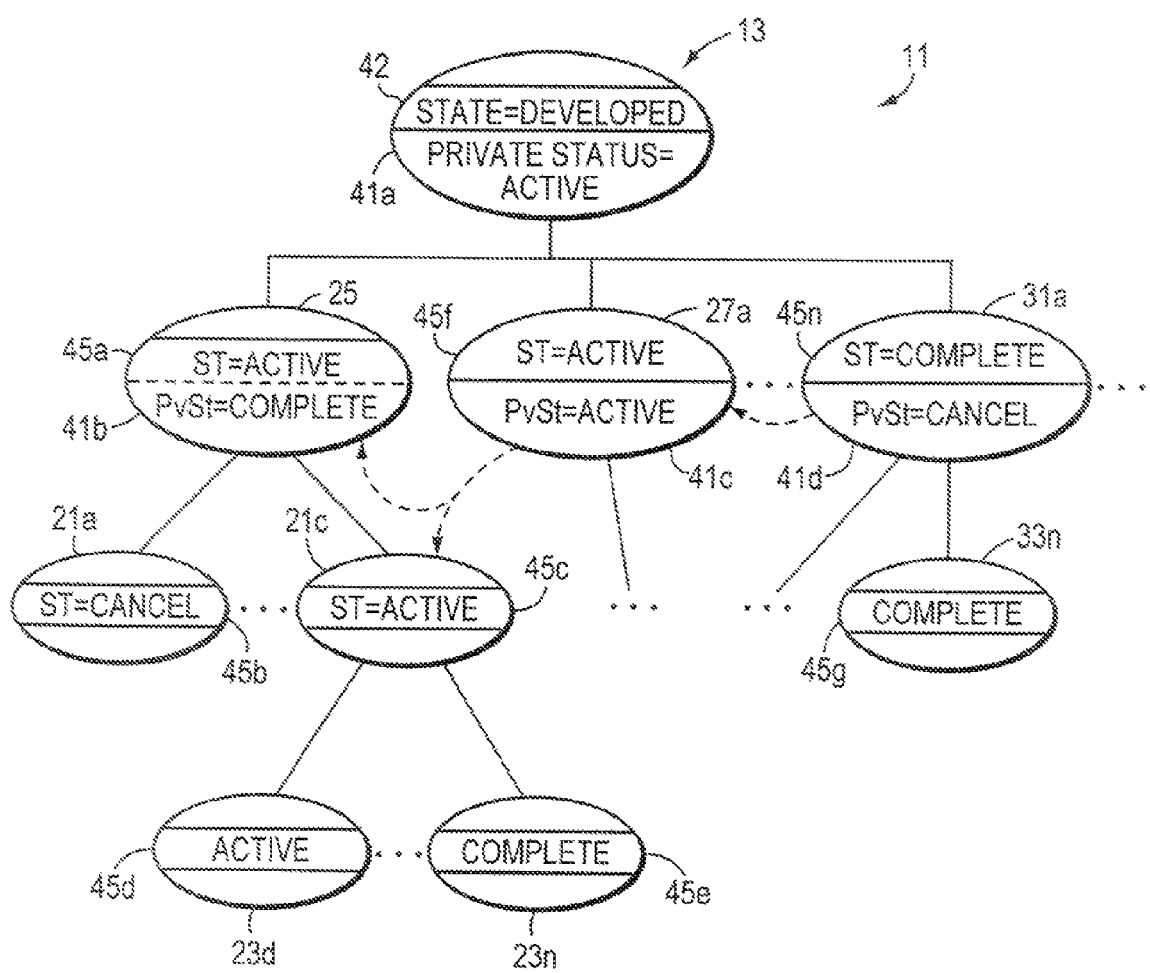

FIG. 2b is a diagram of the internal structure of a computer (e.g., client processor 50 or server computers 60) in the computer system of FIG. 4. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device Interface 82 for connecting various Input and output devices (e.g., keyboard, mouse, displays, printers, speakers, etc.) to the computer 50, 60. Network interface 86 allows the computer to connect to various other devices attached to a network (e.g., network 70 of FIG. 2a). Memory 90 provides volatile storage for computer software instructions 92 and data 94 used to implement an embodiment of the present invention (e.g., change request objects 13, change request object hierarchies 15, 17, 19 and change request manager code 11 detailed below). Disk storage 95 provides non-volatile storage for computer software instructions 92 and data 94 used to implement an embodiment of the present invention. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 can be installed by any suitable software installation procedure, as is well, known in the art. In another embodiment, at least a portion of the software instructions may also be downloaded over a cable, communication and/or wireless connection. In other embodiments, the invention programs are a computer program propagated signal product 107 embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

Figure 3:
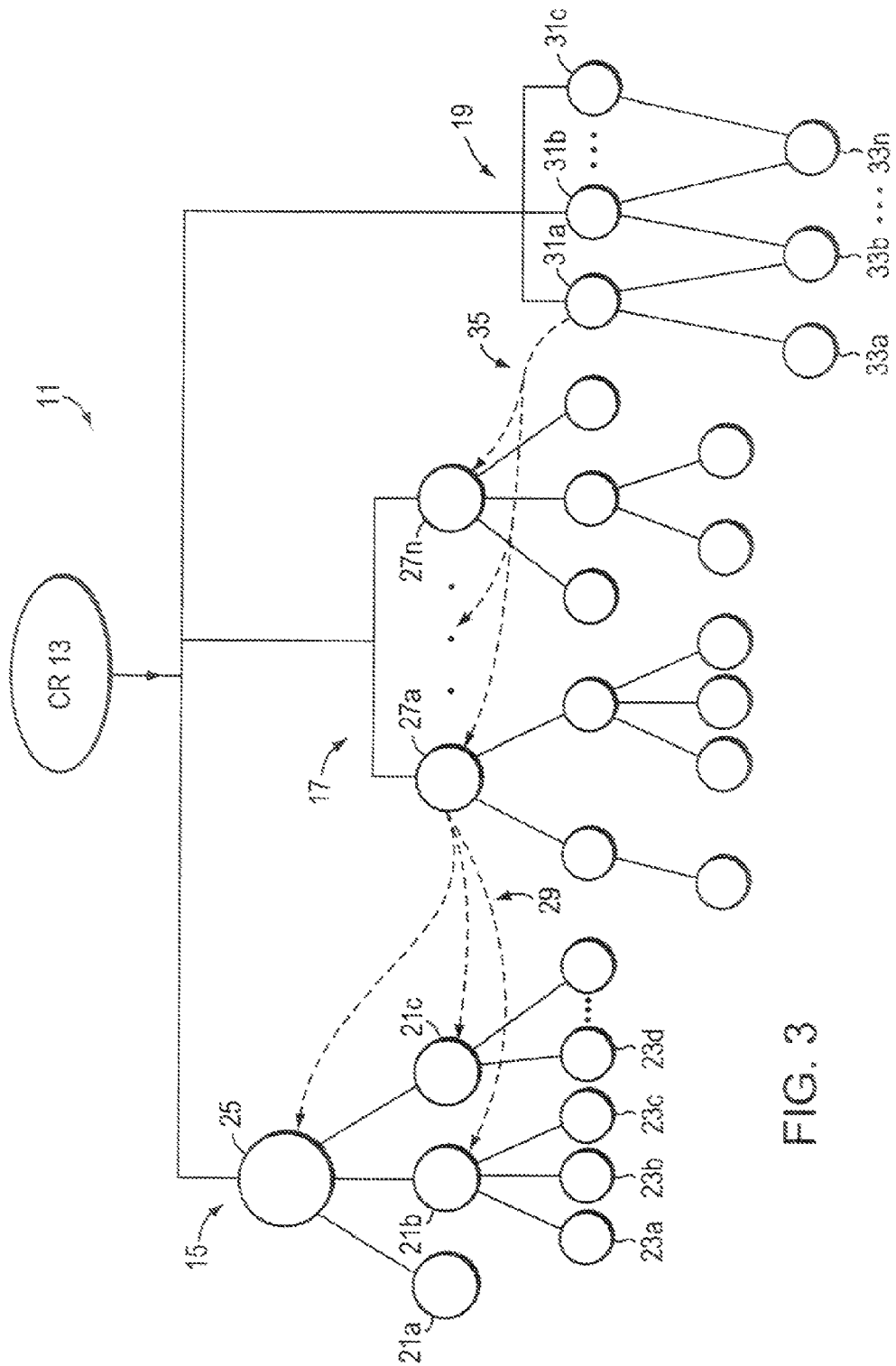
FIGS. 3 and 4 are schematic views of a change request object and corresponding object management system in embodiments of the invention.

Illustrated in FIG. 3 is a change request object 13 of the present invention. The change request object 13 is initiated in response to a given change request and stored in repositories 100 using similar first steps and technology of the prior art. Unlike prior art change request objects 99, however, the invention change request object 13 is partitioned into a set of sub objects 21, 23, 25, 27, 31, 33. Each sub object is of one of the sub object hierarchies, namely an Issue hierarchy 15, a Task hierarchy 17, and an activity hierarchy 19. Preferably, there is one Issue hierarchy 15, and there may be zero or more Task hierarchies 17 and zero or more Activity hierarchies 19. The subject hierarchies 15, 17, 19 are linked to each other such that a given. Task 27 can be associated with multiple Issues 21 (and therefore contribute to multiple Change-Requests), and a given Activity 31 can be associated with multiple Tasks 27 (and therefore contribute to multiple Change-Requests). Each sub-object 21, 23, 25, 27, 31, 33 is owned by a single stake-holder (user) and has its own Status field that identifies the state of the subject Change-Request 13 from the perspective of that individual (user). Each stake-holder then interacts with a single sub-object with a relatively simple set of Status values and Status transitions, while the State of the Change-Request 13 is a composite value computed from the Status of each of the objects in the sub-object hierarchies 15, 17, 19 of the Change-Request 13.

The Issue hierarchy 15 contains information about the motivation for a Change-Request 13. This might be a problem report (a "defect"), or a change to the requirements of the software system (an "enhancement"). Each object 21, 25 in the issue hierarchy 15 represents an issue. An Issue object 21, 25 contains properties that specify requirements on how the Issue needs to be addressed (for example, if a system is released on multiple platforms, what platforms are required). When an Issue can be logically decomposed into multiple sub-Issues, respective sub-objects 23 of the Issue object 21 are created for each of those sub-Issues. This allows the State of a sub-Issue to be independently tracked; for example, the development organization may decide to only address one of the sub-Issues of a given issue.

The Task hierarchy 17 contains a description of the work that would address the Issue (at 21, 25 generally) that motivates the Change-Request 13. A Task (represented by a respective Task object 27a, . . . 27n) is initially created by a triage team that is investigating an Issue 21. If the triage team decides that the Issue 21 is to be addressed, the Status of the Task 27 is set to "Active". Alternatively, the triage team could decide not to address the Issue 21, in which case the Status of the Task 27 is set to "No-Plan-To-Fix".

If a triage team decides that more than one Issue 21b, 21e, 25 can and should be addressed by the same Task 27a, the same Task 27a is linked to all of those Issues 21 (as shown by dashed arrows 29 in FIG. 3). For example, if the same defect is being reported by multiple stake-holders, the invention system 11 links the multiple stake holders versions of Change-Request 13 (as represented by respective issue objects 21, 25) for the defect to the Task 27 for fixing that defect.

When there are several software releases or variants in which an Issue 21 is to be addressed, the system 11 creates a separate Task 27 for each release or variant, and links each Task 27 to the Issue 21.

The Activity hierarchy 19 contains the changes made to perform a given Task 27. If one activity (represented by a respective object 31a for example) completes multiple tasks 27a, . . . 27n, system 11 associates the activity 31a with each of those tasks 27a, . . . 27n (as illustrated at 35 in FIG. 3). If one sub-activity 33 contributes to multiple activities 31, system 11 makes a sub-object 33 of each of those sub-activities.

With regard to state or status value of the change request object 13, attention is turned to FIG. 4. In general an object that has sub-objects is called a "composite object". The Status of a composite object is computed from the Status values of its sub-objects. A composite object may have a Private-Status property 41 which is a Status value that is independent of the Status of its sub-objects, and which contributes to the Status of the composite object as if the private status 41 were the Status value of a sub-object of the composite object.

In the preferred embodiment, there are three pre-defined Status values: Active, Complete, or Cancelled. Each customer-defined Status value is classified as being Active, Complete, or Cancelled. Generally, an object, is Active if its predefined Status is Active or if its customer-defined Status value is classified as being Active. An object is Complete if its predefined Status is Complete or if its customer-defined Status value is classified as being Complete. An object is Cancelled if its predefined Status is Cancelled or if its customer-defined Status value is classified as being Cancelled. The invention system 11 sets the Status 45 of a composite object 21, 25, 27, 31 in FIGS. 3 and 4 to;

"Cancelled" if all of Its sub-objects are Cancelled; otherwise

"Active" if any of its sub-objects are Active; otherwise

"Complete".

System 11 then computes the State 42 of a Change-Request 13 from the Status of the objects 21, 25, 27, 31 in the Issue, Task, and Activity hierarchies 15, 17, 19 associated with the Change-Request. The State 42 is preferably one of: Open, Cancelled, Partially-Scheduled, Scheduled, Partially-Developed, Developed, Complete, No-Plan-To-Fix, or Cancelled.

In particular, invention system 11 defines the State 42 of a Change-Request object 13 with a given root Issue 25 as:

"Cancelled" if root Issue 25 is Cancelled; otherwise

"Open" If there is no Task 27 associated with the root Issue 25; otherwise

"Complete" if there is at least one Complete Task 27 that is associated with the root Issue 25; otherwise "No-Plan-To-Fix" if all Tasks 27 associated with the root Issue 25 are Cancelled; otherwise "Developed" if there is a Complete Activity 31 that is associated with an Active Task 27 that is associated with the root Issue 25.

"Partially-Developed" if there is at least one Active Activity 31 or Complete Activity 31 that is associated with a non-Cancelled Task 27 that is associated with an Issue 21 in the Issue hierarchy 15; otherwise "Scheduled" if there is at least one Active Task 27 associated with the root Issue 25; otherwise "Partially-Scheduled".

In the example illustrated in FIG. 4, invention system 11 sets state 42 of Change Request object 13 to "Developed" because the activity 31a has a status 45a value of "Complete", and this activity 31a is associated with an active task 27a (status 45f value="Active") that is associated with the root issue 25, illustrated by the dashed line arrows. Even though the activity 31a has a private status 41d value of "Cancelled", not all of the activity sub-objects 33 are of status "Cancelled" and none are status "Active". Thus system 11 sets status 45n of composite activity object 31a to "Complete".

Likewise, task object 27a has a private status 41c set to "Active". This follows the above rules that if any of task object's 27a sub-object status 45 (including private status 41c) is "Active", then system 11 sets task object 27a status 45f to "Active", Further, root issue 25 has a private status 41b value of "Complete". Issue objects 21a and 21c have respective status 45b, 45c of "Cancel" and "Active". Issue object 21c is of "Active" status 45c because at least one of its sub-objects 23d . . . 23n has a respective status 45d . . . 45e of "Active". Because root issue 25 is a composite object, its status 45a value is set to "Active" where one of its sub-objects 21c status 45c is "Active".

A sub-object 21, 25, 27, 31 is mastered at the replica of the stake-holder that owns it. When a stake-holder transitions to a different replica (such as when he goes off-line), all sub-objects owned by that stake-holder are automatically transferred to that replica. Since each sub-object is owned and manipulated by a single stake-holder, this avoids delays and loss of information that result when two stake-holders at different sites attempt to update a shared object.

Figure 5:
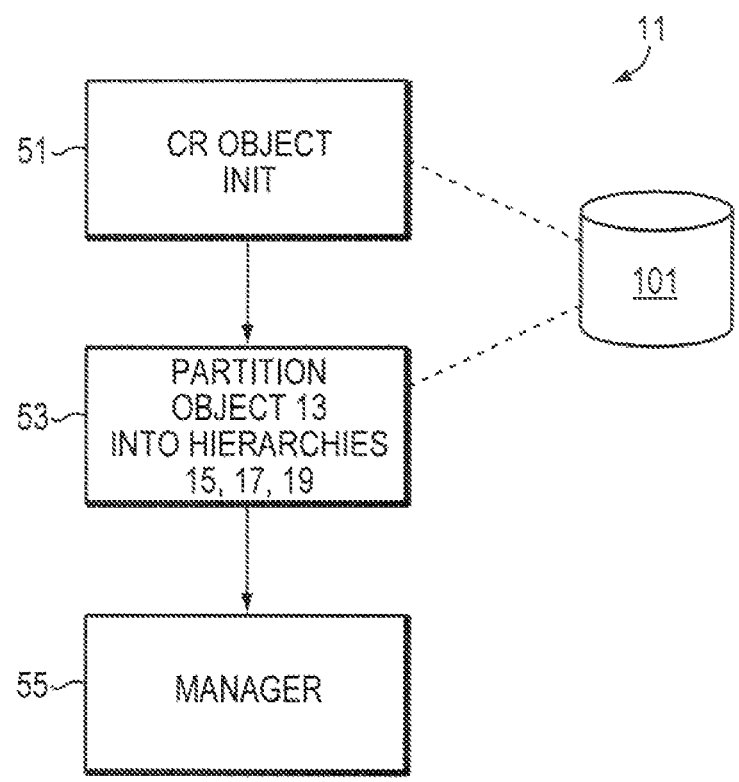
FIG. 5 is a block diagram of one embodiment of the present invention.

According to the foregoing, embodiments of the present invention employ a Change Request object creator 51, partitioning means 53 and Change Request management means (manager system) 55 as shown in FIG. 5. In response to user request to change a subject software system (program or the like), invention, system 11 through Change Request object creator 51 initiates a Change Request object 13. Techniques known, in the art may be employed to implement Change Request object creator 51. Creator 51 stores initiated Change Request objects 13 in a repository 101 similar to the change management repositories 100 of prior art.

Partitioning means 53 generates the issue hierarchy 15, task hierarchy 17 and activity hierarchy 19 corresponding to a Change Request object 13 stored in repository 101. Linked objects, tree structures and other data structures are employed.

Change Request management means 55 maintains associations between activity objects 31, task objects 27 and issue/root objects 21, 25. Change Request management means 55 computes and maintains die status 45 values and private status 41 values of the objects 21, 25, 27, 31, 33 in the hierarchies 15, 17, 19 according to the above-described rules in FIGS. 3 and 4. Likewise, manager 55 computes and maintains the respective state 42 values and private status 41 a values of Change Request objects 13 for each stake-holder at the replica of that stake-holder.

While this invention has been particularly shown and described with references to preferred embodiments thereof, it will be understood by those skilled in the art that various changes in form and details may be made therein, without departing from the scope of the invention encompassed by the appended claims.

For example, the present invention may be implemented in a variety of computer architectures. The computer network of FIGS. 2a and 2b are for purposes of illustration and not limitation of the present invention.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical, disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

What is claimed is:

1. A method for making, tracking, and controlling revision control changes to a given software system, comprising the computer implemented steps of:

forming a respective change request object to represent each user's respective request to make a respective revision control change to a given software system;

creating a root issue object for each change request object, the root issue object enabling an issue hierarchy of issue objects, each issue object representing a respective issue;

allowing a user to partition an issue object into issue sub-objects;

allowing a user to create a task object to define work needed to address an issue;

allowing a user to partition a task object into task sub-objects;

allowing a user to create an activity object to track work performed;

allowing a user to partition an activity object into activity sub-objects;

allowing a user to relate issue objects and issue sub-objects to task objects and task sub-objects;

allowing a user to relate task objects and task sub-objects to activity objects and activity sub-objects; and determining state of an object based on status of its related objects and sub-objects; wherein each task object, issue object and activity object is owned by a single respective user as an individual and has a respective status field that identifies state of the change request object from perspective of the individual respective user.

2. A method as claimed in claim 1 wherein the step of forming includes storing the change request object in a repository.

3. A method as claimed in claim 1 wherein the issue hierarchy contains information about motivation for a user's respective request.

4. A method as claimed in claim 3 wherein the step of further allowing a user to partition a task object further includes providing a task hierarchy where the task hierarchy contains a description of a work task that addresses an issue that motivates the user's respective request; and the step of allowing a user to partition an activity object includes providing an activity hierarchy, the activity hierarchy containing changes made to perform one or more work tasks.

5. A method as claimed in claim 4 wherein the step of determining state of an object employs sub-object status values of active, complete and cancelled.

6. A method as claimed in claim 1 wherein the change request object has a private status property value, and the step of determining state of an object includes considering the private status property value as if it were a sub-object status value.

7. A method as claimed in claim 1 wherein the step of determining state of an object employs state values of any combination of: cancelled, open, complete, no plan to fix, developed, partially developed, scheduled and partially scheduled.

8. Computer apparatus for revision control including managing, tracking, and controlling requests to make changes to a given software system, comprising:

a memory;

a processor;

a computer-stored change request object in the memory representing a user's request to make a revision control change to a given software system, there being a different change request object for each different user making a respective user request;

a partitioning member executed by the processor and responsive to the change request objects, the partitioning member:
  creating a root issue object for each change request object, the root issue object enabling an issue hierarchy of the issue objects, each issue object representing a respective issue;
  allowing a user to partition an issue object into issue sub-objects;
  allowing a user to create a task object to define work needed to address an issue;
  allowing a user to partition a task object into task sub-objects;
  allowing a user to create an activity object to track work performed;
  allowing a user to partition an activity object into activity sub-objects;
  allowing a user to relate issue objects and issue sub-objects to task objects and task sub-objects; and
  allowing a user to relate task objects and task sub-objects to activity objects and activity sub-objects; and
a manager executed by a computer determining state of an object based on the status of each of its related objects and sub-objects; wherein each task object, issue object and activity object is owned by a single respective user as an individual and has a respective status field that identifies state of the change request object from perspective of the individual respective user.

9. Computer apparatus as claimed in claim 8 wherein the change request object is stored in a repository.

10. Computer apparatus as claimed in claim 8 wherein the issue hierarchy includes information about motivation for a user's request.

11. Computer apparatus as claimed in claim 10 wherein for a given change request object, the partitioning member effectively partitions the change request object into three hierarchies including the issue hierarchy, a task hierarchy and an activity hierarchy, wherein the task hierarchy contains a description of a task that addresses an issue motivating the respective user's request, and the activity hierarchy contains changes made to perform the task.

12. Computer apparatus as claimed in claim 8 wherein the sub-object status values include: active, complete and cancelled.

13. Computer apparatus as claimed in claim 8 wherein the change request object has a private status property value and the manager includes the private status property value in determining state of the change request object.

14. Computer apparatus as claimed in claim 8 wherein the determined state of the change request object is any of: cancelled, open, complete, no plan to fix, developed, partially developed, scheduled and partially scheduled.

15. Computer program product comprising a non-transitory computer removable storage medium having a computer readable program, wherein the computer readable program when executed by a digital processor causes a computer to:
  (a) form a change request object to represent a user's request to make, track, and control a revision control change to a given software system;
  (b) store the change request object in a repository;
  (c) effectively partition the change request object into hierarchies of object and sub-objects by:
    creating a root issue object for each change request object, the root issue object enabling an issue hierarchy of the issue objects, each issue object representing a respective issue;
    partitioning an issue object into issue sub-objects;
    creating a task object to define work needed to address an issue;
    partitioning a task object into task sub-objects;
    creating an activity object to track work performed;
    partitioning an activity object into activity sub-objects;
    relating issue objects and issue sub-objects to task objects and task sub-objects; and
    relating task objects and task sub-objects to activity objects and activity sub-objects; and
  (d) determine state of an object based on the status of each of its related objects and sub-objects; wherein each task object, issue object and activity object is owned individually by a single respective user and has a respective status field that identifies state of the change request object from perspective of the individual respective user.

16. A computer program product as claimed in claim 15 wherein the step of effectively partitioning into hierarchies includes the issue hierarchy, a task hierarchy and an activity hierarchy, wherein the issue hierarchy includes information about motivation for the user's request, the task hierarchy contains a description of one or more work tasks which address an issue that motivates the user's request, and the activity hierarchy contains changes made to perform one or more of the work tasks.

17. A computer program product as claimed in claim 15 wherein the step of determining state of an object employs sub-object status values of active, complete and cancelled.

18. A computer program product as claimed in claim 15 wherein the change request object has a private status property value, and the step of determining state includes considering the private status property value as if it were a sub-object status value.

19. A computer program product as claimed in claim 15 wherein the step of determining state employs state values of any combination of: cancelled, open, complete, no plan to fix, developed, partially developed, scheduled and partially scheduled.

20. A computer program product as claimed in claim 15 wherein the given software system includes an application program or a program portion.

21. Computer apparatus for managing, tracking, and controlling revision control requests to make changes to a subject software system, comprising:
  (a) computer means executed by a computer for generating a change request object and storing the change request object in a repository, the change request object representing a user's request to make a revision control change to the subject software system;
  (b) partitioning means executable by a computer for creating a root issue object for each change request object, the root issue object enabling an issue hierarchy of the issue objects, each issue object representing a respective issue, the partitioning means further allowing partitioning of an issue object into issue sub-objects,
  allowing creation of a task object to define work needed to address an issue,
  allowing partitioning of a task object into task sub-objects,
  allowing creation of an activity object to track work performed,
  allowing partitioning of an activity object into activity sub-objects,
  relating issue objects and issue sub-objects to task objects and task sub-objects, and
  relating task objects and task sub-objects to activity objects and activity sub-objects; and (c) manager means executable by a computer for determining state of an object based on status of each of its related objects and sub-objects; wherein each task object, issue object and activity object is owned by a single respective user as an individual and has a respective status field that identifies state of the change request object from perspective of the individual respective user.

22. Computer apparatus as claimed in claim 21 wherein the subject software system is any of an applications program or a part thereof.

23. In a computer system, a method for handling, tracking, and controlling revision control change requests of a subject software program or part thereof, comprising the steps of:

for a given user's request to make a revision control change to the subject software, forming a change request object in a computer;

in one or more computers, forming one or more hierarchies of objects and sub-objects for the change request object, to represent work needed to be performed and work performed in making the revision control change to the subject software, certain objects and sub-objects being related to other objects and sub-objects in the one or more hierarchies; and for each object, using a computer and determining state of an object based on status of each of its related objects and sub-objects; wherein each object is owned by a single respective user as an individual and has a status field identifying state of the change request from perspective of the individual respective user;

wherein the step of forming one or more hierarchies includes:

creating a root issue object for each change request object, the root issue object enabling an issue hierarchy of the issue objects, each issue object representing a respective issue;

partitioning an issue object into issue sub-objects;

creating a task object to define work needed to address an issue;

partitioning a task object into task sub-objects;

creating an activity object to track work performed;

partitioning an activity object into activity sub-objects;

relating issue objects and issue sub-objects to task objects and task sub-objects; and relating task objects and task sub-objects to activity objects and activity sub-objects.

\* \* \* \* \*